(12) United States Patent
Kiso

(10) Patent No.: US 10,200,586 B2
(45) Date of Patent: *Feb. 5, 2019

(54) IMAGING APPARATUS CAPABLE OF INTERVAL PHOTOGRAPHING

(71) Applicant: CASIO COMPUTER CO., LTD., Tokyo (JP)

(72) Inventor: Toshiya Kiso, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/644,577

(22) Filed: Jul. 7, 2017

(65) Prior Publication Data

US 2017/0310875 A1 Oct. 26, 2017

Related U.S. Application Data

(63) Continuation of application No. 14/830,570, filed on Aug. 19, 2015, now Pat. No. 9,749,516.

(30) Foreign Application Priority Data

Aug. 26, 2014 (JP) .................................. 2014-171369

(51) Int. Cl.
*H04N 5/232* (2006.01)
*H04N 5/247* (2006.01)
*H04N 5/04* (2006.01)

(52) U.S. Cl.
CPC ......... *H04N 5/23206* (2013.01); *H04N 5/232* (2013.01); *H04N 5/23241* (2013.01);
(Continued)

(58) Field of Classification Search
CPC ........ G08B 13/19641; G08B 13/19643; G08B 13/19645; G08B 13/19628; H04N 7/181;
(Continued)

(56) References Cited

U.S. PATENT DOCUMENTS 7,339,620 B1 * 3/2008 Yamagishi ......... H04N 5/23212
348/220.1
7,689,840 B2 * 3/2010 Mizutani .................. G03B 7/26
348/372

(Continued)

FOREIGN PATENT DOCUMENTS

JP H9-197546 A 7/1997
JP 2001-75167 A 3/2001
(Continued)

OTHER PUBLICATIONS

Japanese Office Action dated Mar. 13, 2018, issued in corresponding Japanese Patent Application No. 2014-171369. (7 pages).

*Primary Examiner* — Pritham Prabhakher
(74) *Attorney, Agent, or Firm* — Fitch, Even, Tabin & Flannery LLP

(57) ABSTRACT

In synchronous interval photographing by a plurality of imaging apparatuses, an imaging apparatus functioning as a master clocks a photographing interval in the interval photographing, sequentially generates photographing instruction signals at clocked photographing intervals, instructs its own imaging section to perform image photographing every time a photographing instruction signal is generated, and transmits the photographing instruction signal to the other imaging apparatus. The imaging apparatus functioning as the slave instructs its own imaging section to perform image photographing every time a photographing instruction signal is received from the imaging apparatus functioning as the master.

12 Claims, 10 Drawing Sheets

(52) U.S. Cl.
CPC ............... *H04N 5/247* (2013.01); *H04N 5/04* (2013.01); *H04N 5/23245* (2013.01)

(58) Field of Classification Search
CPC .... H04N 5/247; H04N 5/2251; H04N 5/3415; H04N 5/23238; H04N 5/23232; H04N 5/23206; H04N 5/04; H04N 5/23241; H04N 5/23245; H04N 5/232; H04N 13/0239; H04N 13/0242; H04N 3/1593; H04N 2013/0088; B60R 2300/105; G06T 2200/32; G03B 37/00; G03B 37/02; G03B 37/04; G03B 37/06
USPC ........................................................ 348/211.3
See application file for complete search history.

(56) References Cited

U.S. PATENT DOCUMENTS

| | | | | |
|---|---|---|---|---|
| 7,844,265 | B2* | 11/2010 | Kuchibhotla | H04W 52/0238 455/423 |
| 8,326,141 | B1* | 12/2012 | Clark | G03B 15/03 396/198 |
| 8,700,707 | B2* | 4/2014 | Kowalewski | H04L 65/1016 709/204 |
| 9,204,041 | B1 | 12/2015 | Campbell | |
| 9,330,436 | B2 | 5/2016 | MacMillan et al. | |
| 9,674,473 | B2 | 6/2017 | Fujihashi | |
| 2008/0036871 | A1 | 2/2008 | Ohmura et al. | |
| 2008/0143875 | A1 | 6/2008 | Scott et al. | |
| 2008/0298792 | A1* | 12/2008 | Clark | G03B 17/00 396/56 |
| 2009/0251601 | A1* | 10/2009 | Ihlefeld | H04N 5/0733 348/521 |
| 2011/0268002 | A1* | 11/2011 | Liu | H04W 52/0232 370/311 |
| 2012/0194683 | A1* | 8/2012 | Goldberg | G01D 4/002 348/160 |
| 2012/0265807 | A1 | 10/2012 | Kowalewski | |
| 2012/0307029 | A1* | 12/2012 | Nambakam | A61B 1/00016 348/68 |
| 2013/0169861 | A1* | 7/2013 | Yoshino | H04N 5/23241 348/372 |
| 2013/0242135 | A1 | 9/2013 | Muraki et al. | |
| 2013/0278728 | A1 | 10/2013 | Gong et al. | |
| 2014/0253742 | A1* | 9/2014 | Ishii | H04N 5/23245 348/207.1 |
| 2015/0050958 | A1* | 2/2015 | Koreki | H04W 64/00 455/550.1 |
| 2015/0264202 | A1* | 9/2015 | Pawlowski | H04N 1/00106 348/207.11 |
| 2015/0271483 | A1 | 9/2015 | Sun et al. | |
| 2015/0281590 | A1 | 10/2015 | MacMillan et al. | |
| 2015/0281622 | A1 | 10/2015 | Fujihashi | |

FOREIGN PATENT DOCUMENTS

| | | |
|---|---|---|
| JP | 2001-109037 A | 4/2001 |
| JP | 2015-184522 A | 10/2015 |

* cited by examiner

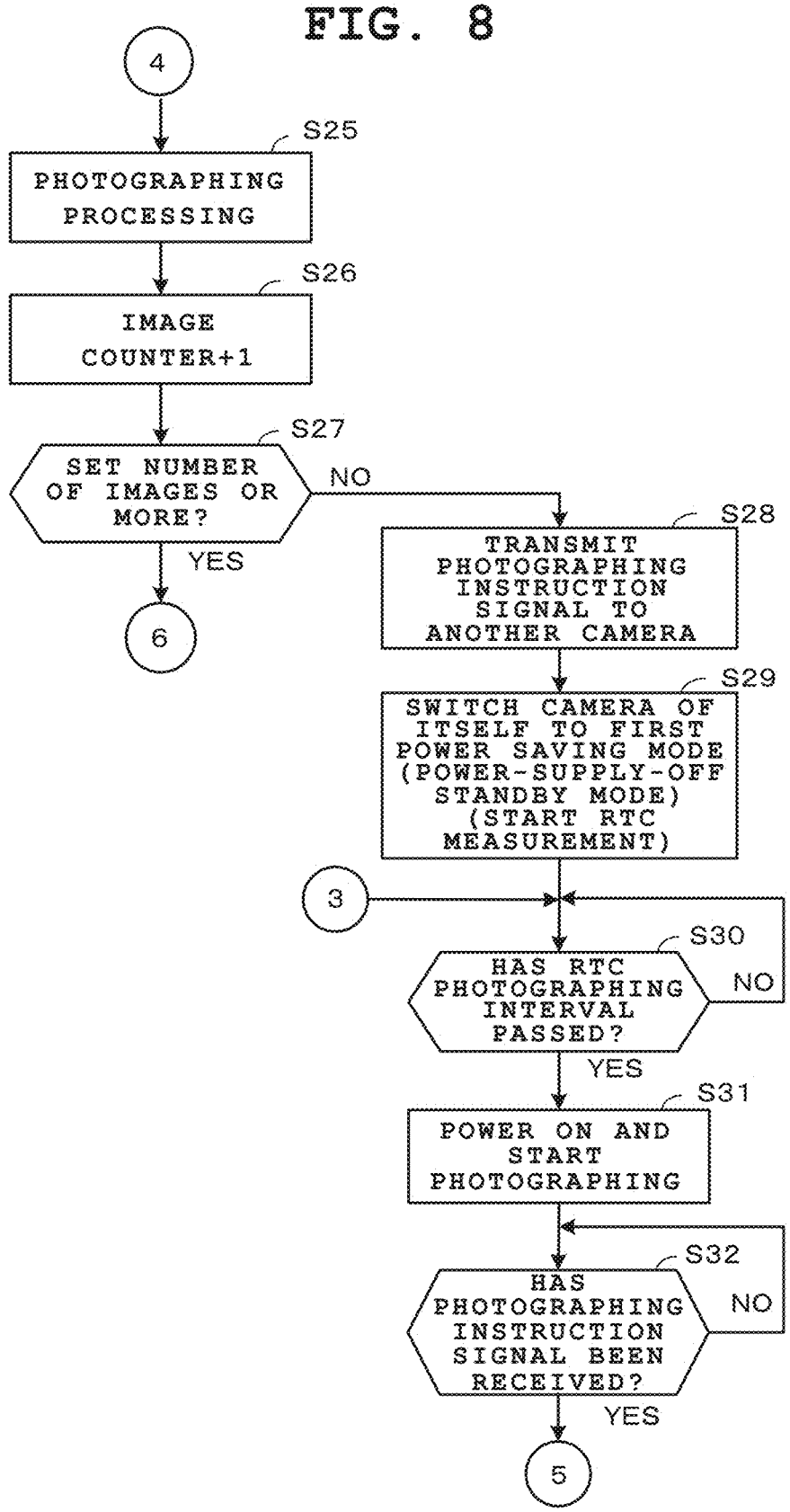

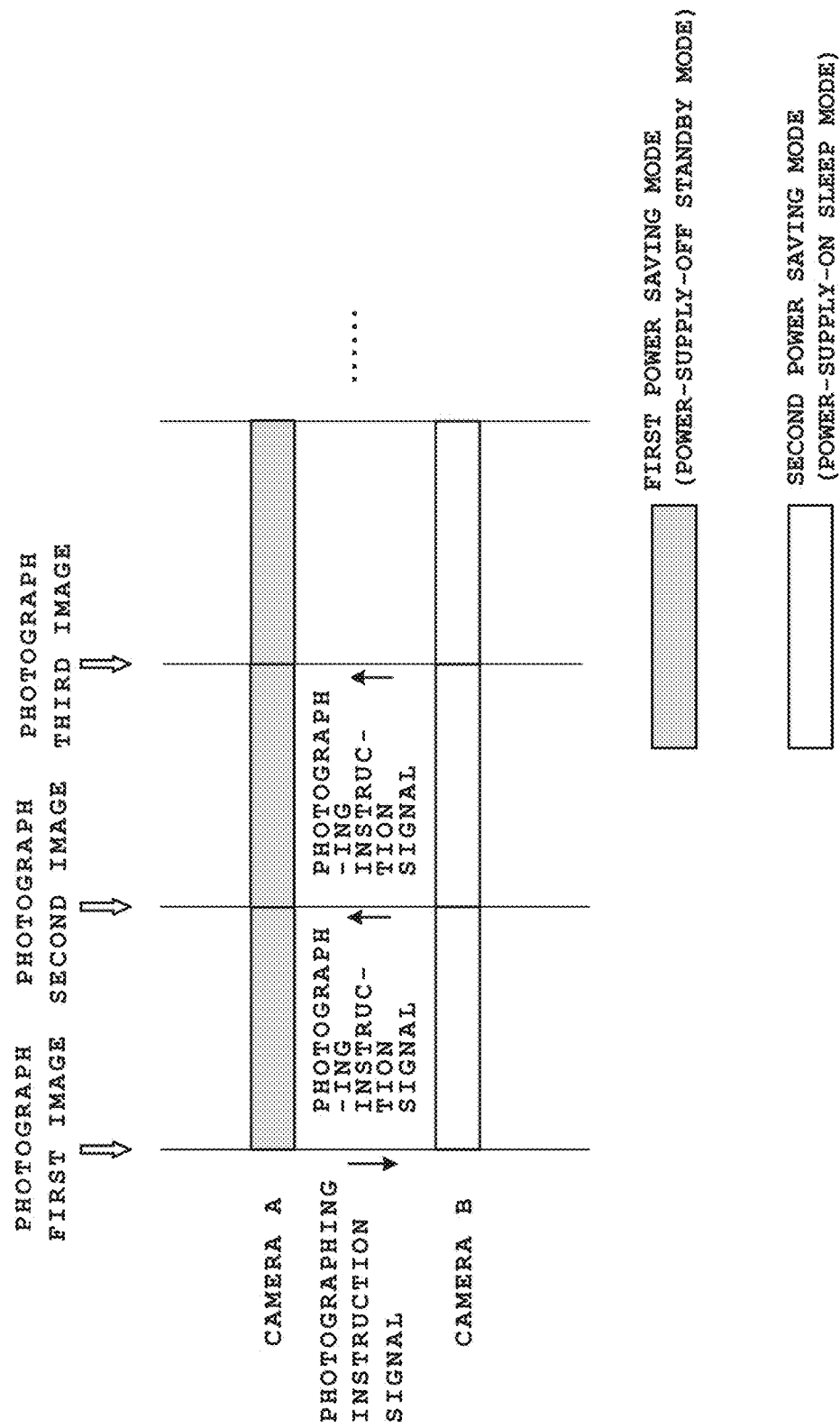

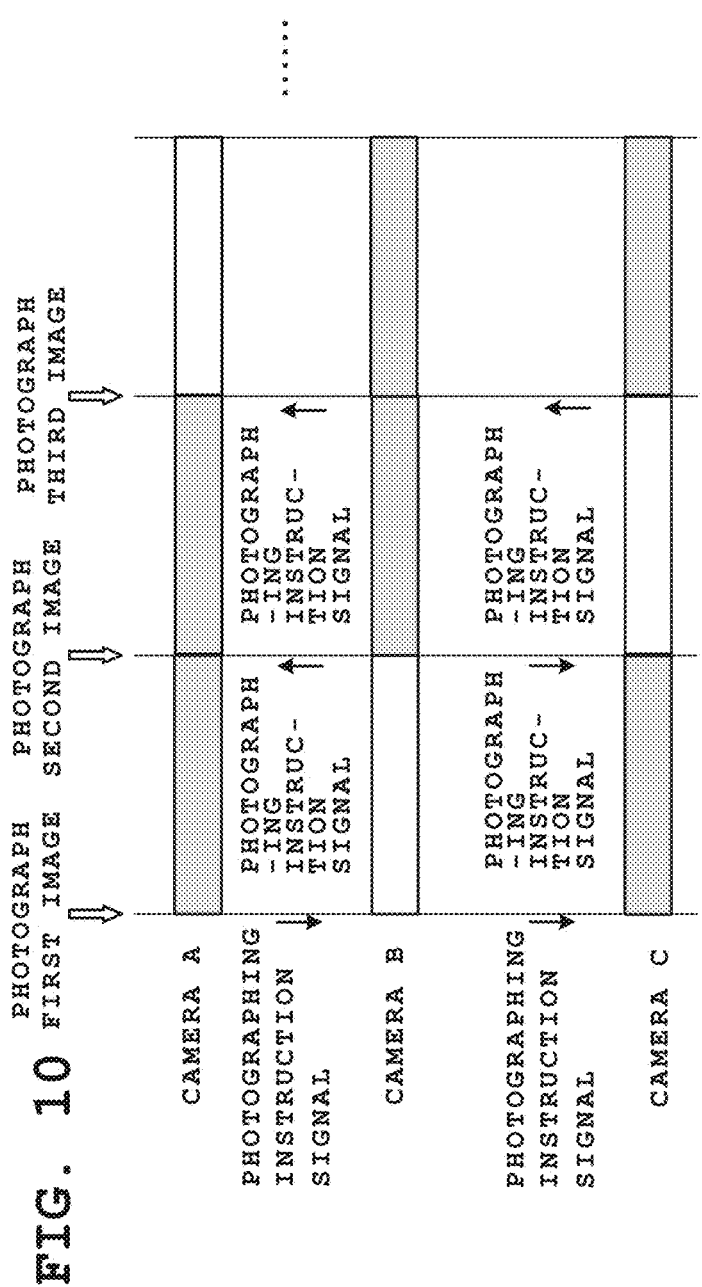

IMAGING APPARATUS CAPABLE OF INTERVAL PHOTOGRAPHING

CROSS-REFERENCE TO RELATED APPLICATIONS

This application is a continuation of U.S. application Ser. No. 14/830,570, filed Aug. 19, 2015, which claims the benefit of the filing date of Japanese Patent Application No. JP 2014-171369, filed Aug. 26, 2014, which are incorporated herein by reference in their entirety.

BACKGROUND OF THE INVENTION

1. Field of the Invention

The present invention relates to an imaging apparatus, an imaging system, and a photographing method by which interval photographing of sequentially photographing a plurality of images at predetermined photographing intervals can be performed.

2. Description of the Related Art

A conventional technology is known in which, when an imaging apparatus such as a digital camera is photographing, for example, a plant about to bloom at relatively-long predetermined photographing intervals by using an interval photographing function for sequentially photographing a plurality of images at specified photographing intervals (time intervals), power supply to the camera is stopped while the photographing is not being performed in order to suppress battery consumption even in this long-time photographing, and power is supplied to the camera at the time of the photographing to set a photographable state (for example, refer to Japanese Patent Application Laid-Open (Kokai) Publication No. 09-197546).

SUMMARY OF THE INVENTION

In accordance with one aspect of the present invention, there is provided an imaging apparatus capable of interval photographing, comprising: an imaging section which performs interval photographing of sequentially photographing a plurality of images at predetermined photographing intervals; a wireless communicating section which wirelessly and communicably connects the imaging apparatus with an other imaging apparatus; an operation section which specifies an arbitrary photographing interval for the interval photographing; and a control section which sequentially generates photographing instruction signals at photographing intervals specified by the operation section, wherein the control section instructs its own imaging section to perform image photographing when a photographing instruction signal is generated, and transmits the photographing instruction signal to the other imaging apparatus via the wireless communicating section so as to control interval photographing where photographing timing of the imaging apparatus and photographing timing of the other imaging apparatus are synchronized with each other.

In accordance with another aspect of the present invention, there is provided an imaging system capable of synchronous interval photographing by a plurality of imaging apparatuses, wherein an imaging apparatus functioning as a master (i) clocks photographing intervals in the interval photographing, (ii) sequentially generates photographing instruction signals at the clocked photographing intervals, (iii) instructs its own imaging section to perform image photographing and transmits a photographing instruction signal to an other imaging apparatus functioning as a slave every time a photographing instruction signal is generated, and wherein the other imaging apparatus functioning as the slave instructs its own imaging section to perform image photographing every time a photographing instruction signal is received from the imaging apparatus functioning as the master.

In accordance with another aspect of the present invention, there is provided a photographing method by an imaging apparatus capable of interval photographing, comprising: a step of specifying an arbitrary photographing interval for the interval photographing; a step of clocking the specified photographing interval; a step of sequentially generating photographing instruction signals at clocked photographing intervals; and a step of instructing its own imaging section to perform image photographing and transmitting a photographing instruction signal to an other imaging apparatus every time a photographing instruction signal is generated, so as to perform interval photographing where photographing timing of the imaging apparatus and photographing timing of the other imaging apparatus are synchronized with each other.

In accordance with another aspect of the present invention, there is provided a photographing method for synchronous interval photographing by a plurality of imaging apparatuses, comprising: a step of controlling an imaging apparatus functioning as a master such that the imaging apparatus functioning as the master (i) clocks photographing intervals in the interval photographing, (ii) sequentially generates photographing instruction signals at the clocked photographing intervals, (iii) instructs its own imaging section to perform image photographing and transmits a photographing instruction signal to an other imaging apparatus functioning as a slave every time a photographing instruction signal is generated; and a step of controlling the imaging apparatus functioning as the slave such that the imaging apparatus functioning as the slave instructs its own imaging section to perform image photographing every time a photographing instruction signal is received from the imaging apparatus functioning as the master.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 8 is the flowchart of an operation following that of FIG. 7;

FIG. 9 is a diagram for describing a modification example of the embodiment; and FIG. 10 is a diagram for describing another modification example of the embodiment.

DETAILED DESCRIPTION OF THE PREFERRED EMBODIMENTS

Hereafter, an embodiment of the present invention will be described with reference to FIG. 1 to FIG. 8.

Figure 1:
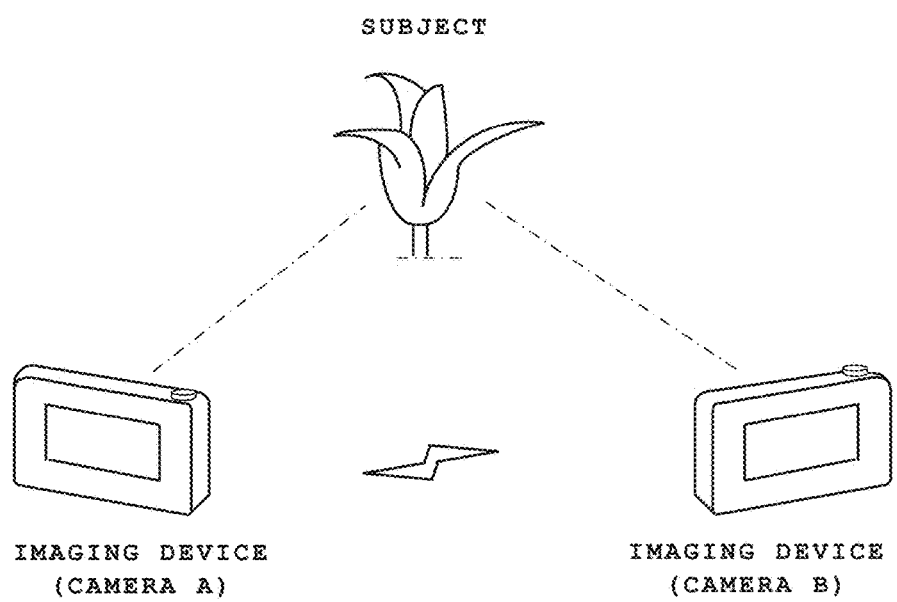
FIG. 1 is a diagram depicting an imaging system in which a plurality of imaging apparatuses (cameras) have been communicably connected to each other in order to simultaneously perform interval photographing on the same photographic subject from different positions.

FIG. 1 is a diagram depicting an imaging system in which a plurality of imaging apparatuses (cameras) have been communicably connected to each other in order to simultaneously perform interval photographing on the same photographic subject from different positions.

The imaging apparatuses (cameras), which are compact digital cameras having a battery cell as a power supply, are capable of performing still image photographing and moving image capturing, and have an interval photographing function. In this interval photographing function, a plurality of images is sequentially photographed at predetermined photographing intervals. Here, an instruction to photograph a first image is provided by a photographer's shutter operation, and instructions to photograph a second image and the following images are automatically provided by the imaging apparatus at photographing intervals set by a user operation, whereby image photographing is repeatedly performed by the number of images set in advance by a user operation. The interval photographing function includes a normal interval photographing function for performing interval photographing by a single camera and a simultaneous interval photographing function for simultaneously performing interval photographing on the same subject from different positions by a plurality of cameras.

An example in the drawing shows a state where interval photographing (simultaneous photographing) operations are simultaneously performed on the same photographic subject from different positions by a plurality of (two) cameras. Specifically, the interval photographing is performed on the photographic subject (such as a flower about to bloom) by the cameras installed on the left and right sides of the subject. The cameras perform interval photographing on the same subject (flower) from different positions at photographing intervals of, for example, ten seconds. Camera A installed on the left side and camera B installed on the right side have a master-slave relation, in which one camera functions as a camera on the master side and the other camera functions as a camera on the slave side.

The "photographing interval" herein refers to a time interval between preceding image photographing and the following image photographing in interval photographing, which is repeated for image photographing (a time interval immediately after the end of the preceding image photographing and before the start of the following image photographing is referred to as a "photographing standby interval" when it is referred distinctively from the photographing interval). This "photographing interval" has an arbitrary value set in advance by a user operation. In this master-slave relation, image photographing by the camera on the slave side is performed by following an instruction from the camera on the master side. Camera A and camera B are communicably connected to each other via short-distance wireless communication, such as wireless LAN (Local Area Network) or Bluetooth (registered trademark) communication.

Figure 2:
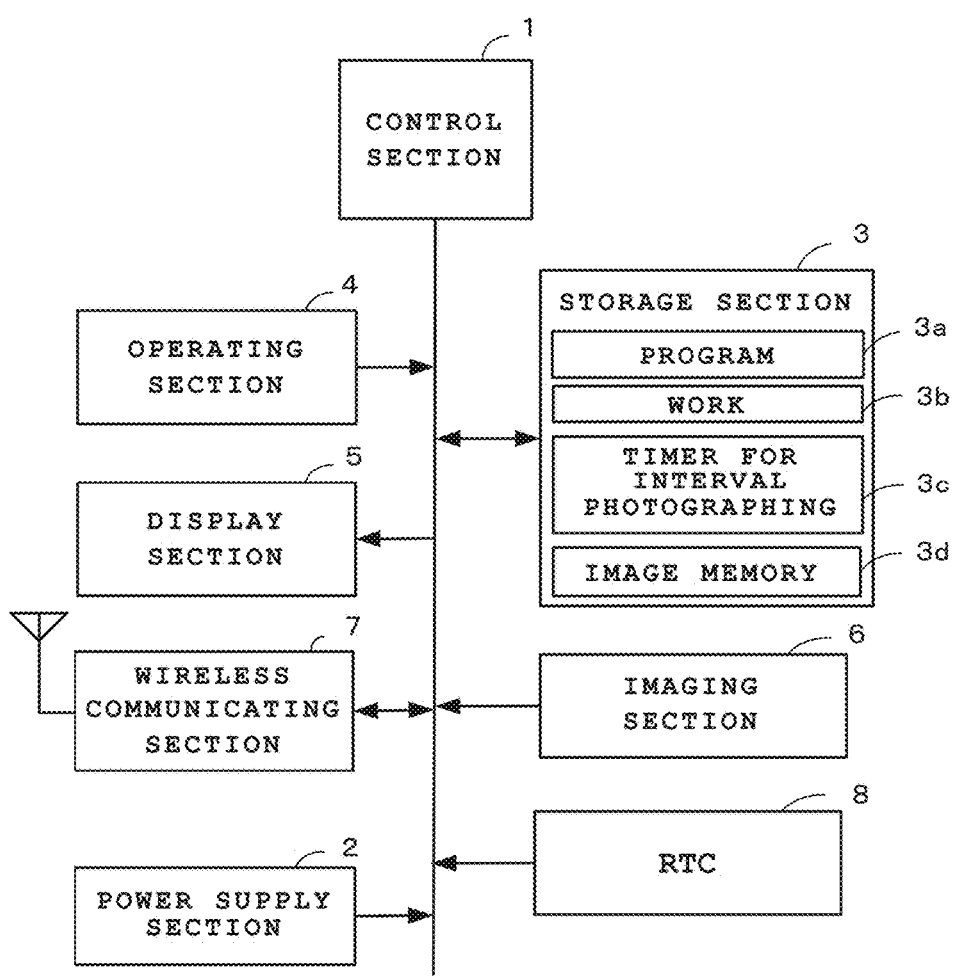
FIG. 2 is a block diagram depicting basic components of each camera.

FIG. 2 is a block diagram depicting basic components of the imaging apparatus (camera).

A control section 1, which is operated by power supply from a power supply section (secondary battery) 2, has a central processing unit which controls the entire operation of the camera according to various programs in a storage section 3, a memory, and the like. The power supply section 2 is a main power supply for supplying power to the camera (such as the control section 1 and the storage section 3). The storage section 3 is structured to have, for example, a ROM (Read-Only Memory), a flash memory, and a program memory 3a having stored therein programs, various applications, and the like for achieving the present embodiment by following an operation procedure depicted in FIG. 5 to FIG. 8, which will be described further below.

In addition, the storage section 3 has a work memory 3b for temporarily storing various information required for the camera to operate (such as photographing parameters for interval photographing and image counter values for counting the number of images in interval photographing), a later-described timer 3c for interval photographing, and an image memory 3d for recording and storing each photographed image. Note that the storage section 3 may be structured to include, for example, a removable portable memory (recording medium) such as an SD (Secure Digital) card or an IC (Integrated Circuit) card, or may be structured to include, although not shown, a storage area on a predetermined server apparatus side in a case where the camera is connected to a network by a communication function.

The control section 1 has connected thereto an operation section 4, a display section 5, an imaging section 6, a wireless communicating section 7, an RTC (Real Time Clock) 8, and the like as input/output devices, and controls their input/output operations. Although not depicted, the operation section 4 includes a mode change button for switching between an operation mode (photographing mode) where image photographing can be performed and an operation mode for replaying a photographed image (stored image) (replay mode), and for switching the current mode to an interval photographing mode in the photographing mode, a release button for instructing to start image photographing, and a button for setting photographing parameters such as exposure, shutter speed, zoom, and focus and a photographing parameter for interval photographing (such as a photographing interval). As processing according to an input operation signal from this operation section 4, the control section 1 performs mode change processing, photographing control processing, photographing parameter setting processing, and the like. The display section 5 is a high-definition liquid-crystal display or an organic EL (Electro Luminescence) display serving as a monitor screen (live view screen) for displaying an image to be photographed (live view image) or a replay screen for replaying a photographed image.

The imaging section 6, which can photograph a subject with high definition by a subject image from an optical lens being formed on an image pickup element (such as a CCD (Charge-Coupled Device) or CMOS (Complementary Metal Oxide Semiconductor)) omitted in the drawings, is structured to have an imaging lens, the image pickup element, a stroboscope, various sensors, an analog processing section, and a digital processing section. A photoelectrically converted image signal (analog-value signal) is subjected to color separation and gain adjustment for each RGB color component, and then converted to digital-value data. This digitally converted image data is displayed on the display section 5 by full-color display. The wireless communicating section 7 performs short-distance wireless communication with another camera via a wireless LAN or the like.

The RTC (Real Time Clock: clock circuit section) 8 is structured to include an integral clock that is operated by a clock different from a camera clock or a system clock, and clocks time in seconds. This RTC 8 can operate by power supply from a special battery (not depicted) even when power supply to the camera (such as the control section 1 and the storage section 3) is OFF (main-body power supply OFF state). Also, the RTC 8 is a clock circuit section having a simple structure whose power consumption is low and accuracy in a time unit that can be clocked is low as compared with the timer 3c for interval photographing which operates when power supply to the camera is ON. As will be described below, the RTC 8 has a function for clocking a photographing standby time for interval photographing (standby interval) and executing automatic activation (wakeup) for the next photographing. The timer 3c for interval photographing, which can acquire detailed time information up to units of 1/100 seconds by operating with a camera clock or a system clock when power supply to the camera is ON, clocks a time interval in interval photographing.

Figure 3:
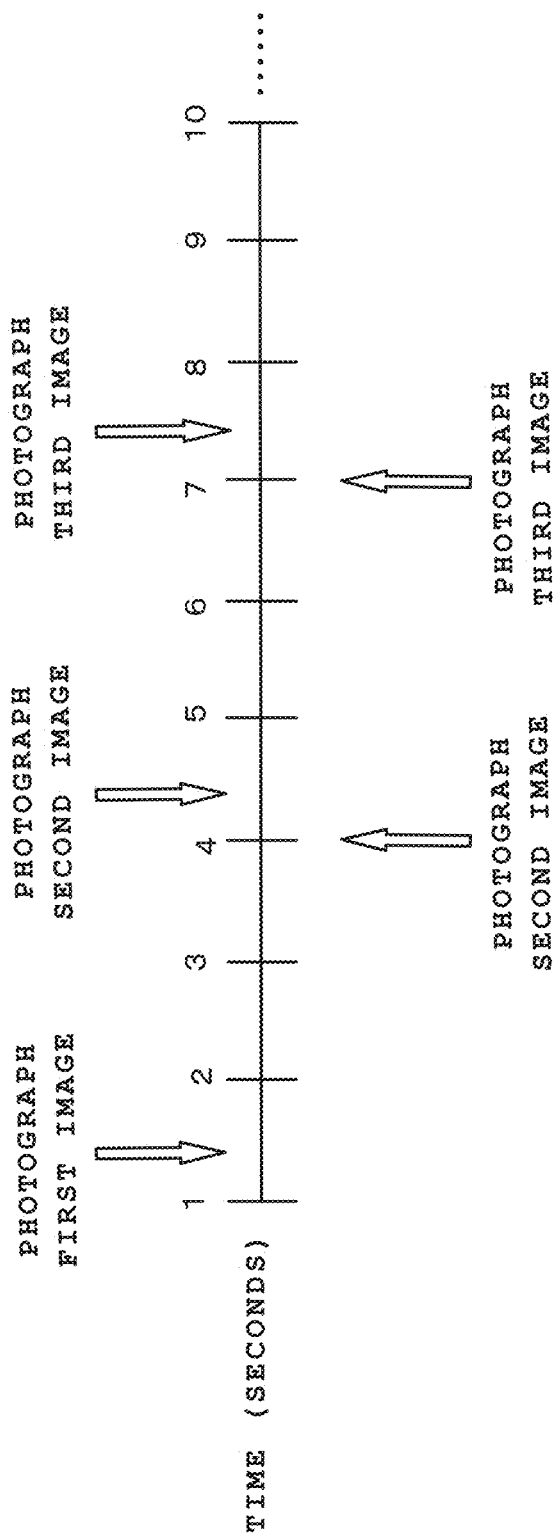
FIG. 3 is a diagram exemplarily depicting each photographing timing when a time interval for interval photographing is clocked by an RTC 8 and by a timer 3c for interval photographing.

FIG. 3 is a diagram exemplarily depicting each photographing timing when a time interval for interval photographing is clocked by the RTC 8 and by the timer 3c for interval photographing.

In interval photographing, in order to suppress battery (main body power supply) consumption, a low power consumption state for suppressing power supply is set when image photographing is not being performed (a photographing standby state immediately after preceding image photographing is ended before the following image photographing is started). Similarly, in a photographing standby state in simultaneous interval photographing by a plurality of cameras, a low power consumption state is set. For simultaneous interval photographing, a first power saving mode and a second power saving mode having different low power consumption states (consumption levels) are provided.

The first power saving mode is a power supply mode in a low power consumption state in which power supply to the camera is OFF in a photographing standby state and the RTC 8 for clocking a time interval in interval photographing is being operated (power-supply-OFF standby mode). This first power saving mode is optimum for long-duration photographing because battery consumption can be significantly suppressed. The second power saving mode is a power supply mode in a low power consumption state in which the camera is in a non-operating state with power supply to the camera being kept ON and the timer 3c for clocking a time interval for interval photographing is being operated (power-supply-ON sleep mode). Although battery consumption in the second power saving mode is larger than that in the first power saving mode (power-supply-OFF standby mode), an operation of activating the camera is not required, and therefore an operation such as next image photographing can be quickly performed. Thus, the second power saving mode is effective for accurate interval photographing.

An example in the drawing shows interval photographing in the first power saving mode (power-supply-OFF standby mode) and the second power saving mode (power-supply-ON sleep mode).

In this example, when a photographing interval for interval photographing is set at "three seconds" and a photographer performs a release operation at the timing of "1.4 seconds" to photograph a first image, image photographing of a second image is performed at the timing of "4.4 seconds" and image photographing of a third image is performed at the timing of "7.4 seconds", in the second power saving mode. By contrast, in the first power saving mode, the RTC 8 can only perform photographing for each one second with accuracy in units of seconds, and therefore image photographing of a second image is performed at the timing of "four seconds" and image photographing of a third image is performed at the timing of "seven seconds", which are different from the photographing timings in the second power saving mode.

In order to solve this problem, in the present embodiment, when simultaneous interval photographing by a plurality of (for example, two) cameras is performed, one of these two cameras is switched to the first power saving mode, and the other is switched to the second power saving mode. In this case, the camera switched to the second power saving mode functions as a master side, and the camera switched to the first power saving mode functions as a slave side, whereby a deviation in photographing timing between the cameras is solved. That is, the camera on the master side controls simultaneous photographing (interval photographing) with the camera on the slave side.

Figure 4:
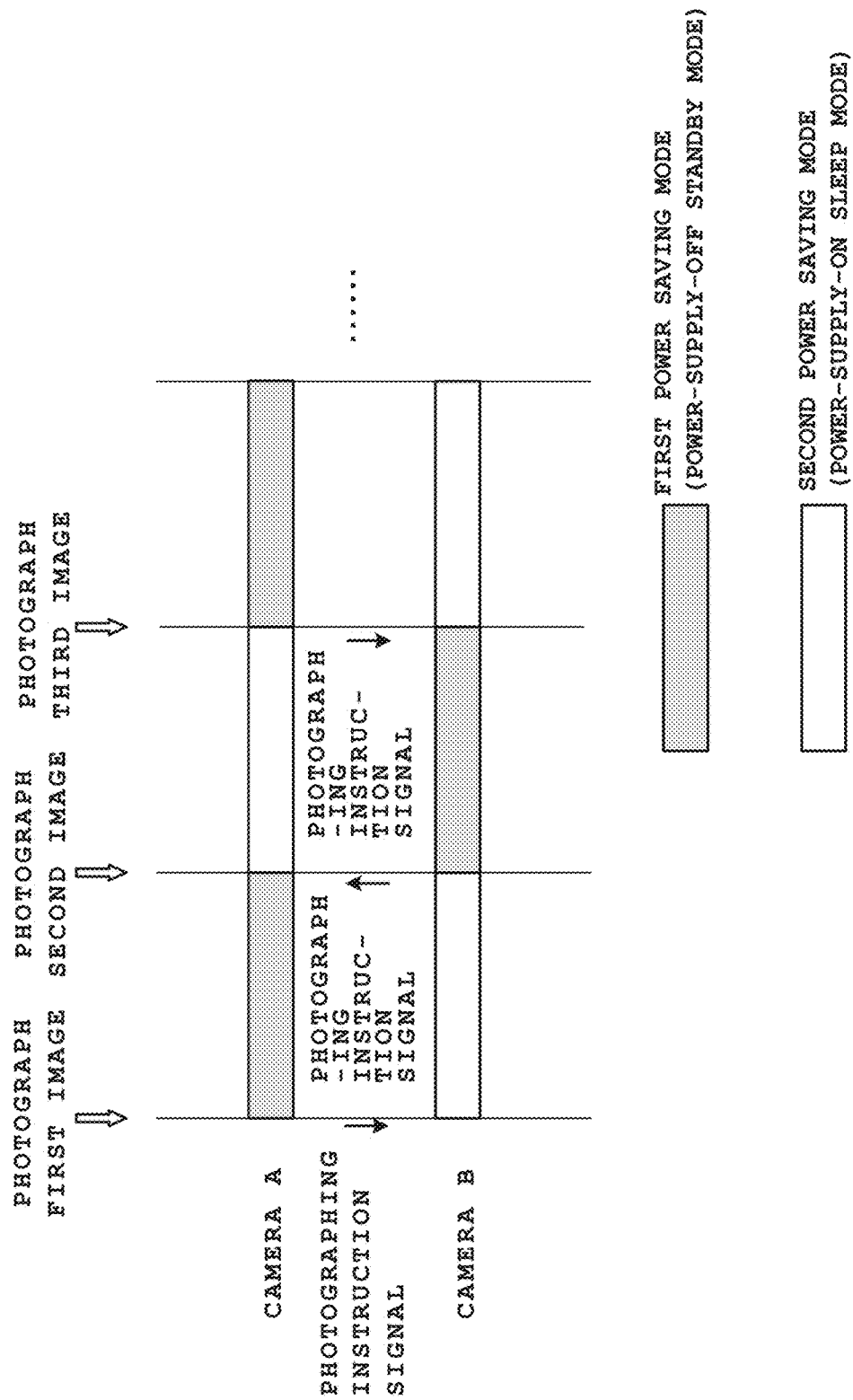
FIG. 4 is a diagram exemplarily depicting photographing timings for first to third images in simultaneous interval photographing by a plurality of cameras.
Figure 5:
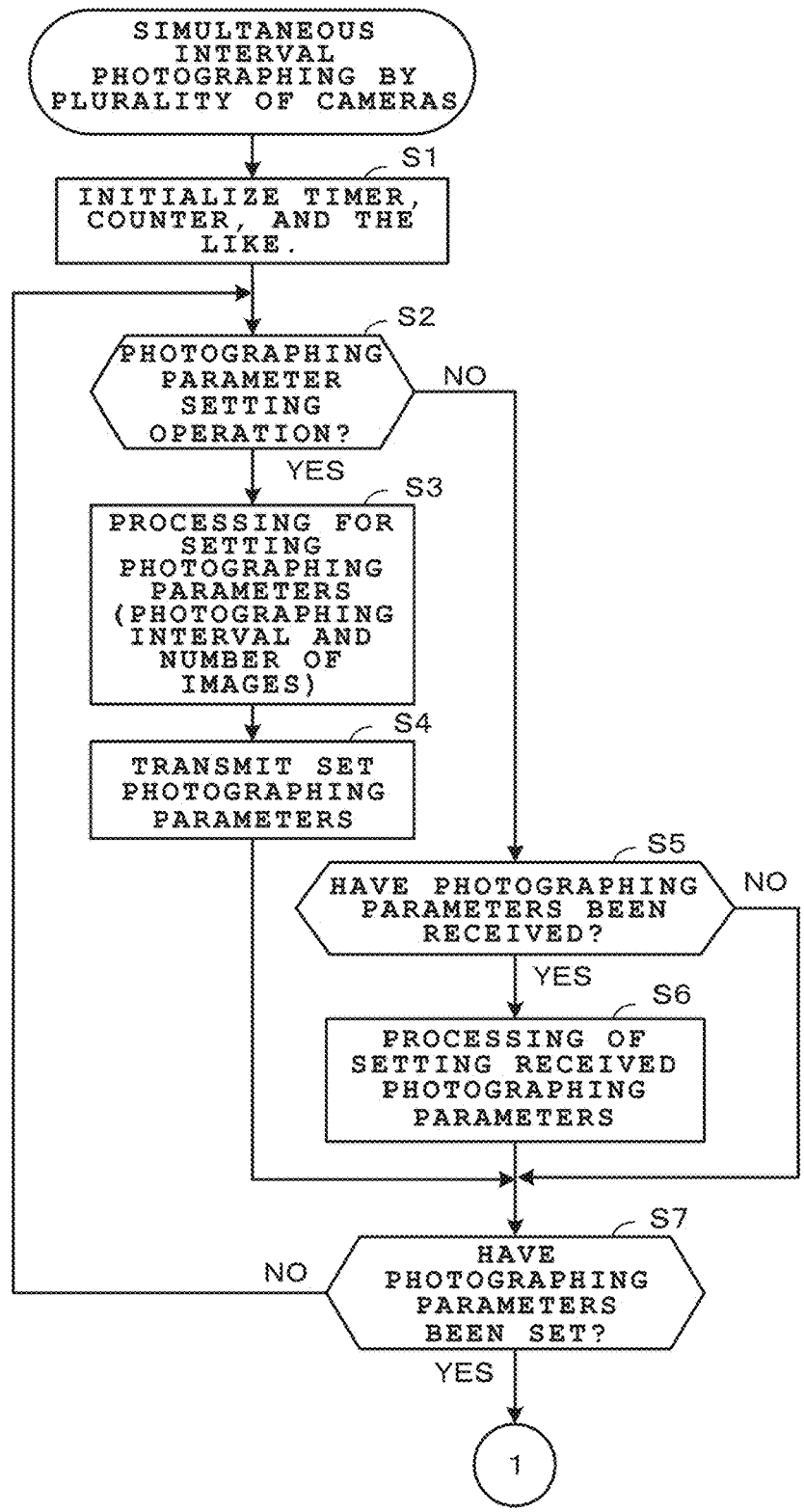
FIG. 5 is a flowchart that is started when simultaneous interval photographing by a plurality of cameras is selected from a menu screen where various photographing modes have been shown by menu display.

FIG. 4 is a diagram exemplarily depicting photographing timings for the first to third images in simultaneous interval photographing by a plurality of cameras.

When a release operation is performed on one camera for simultaneous interval photographing by a plurality of cameras, this camera (camera subjected to the release operation) instructs its own imaging section 6 to perform image photographing, and transmits a photographing instruction signal to the other camera. As a result, simultaneous photographing (photographing of a first image) where the cameras (the camera subjected to the release operation and the other camera) are synchronized with each other is performed. In the example in FIG. 4, from among the cameras shown in FIG. 1 which are camera A installed on the left side and camera B installed on the right side, camera A has been subjected to a release operation. When the first image is photographed as described above, initial setting is performed such that camera A enters the first power saving mode (power-supply-OFF standby mode) and camera B enters the second power saving mode (power-supply-ON sleep mode). Note that gray-colored areas in FIG. 4 represent time periods set in the first power saving mode and blank areas represent time periods set in the second power saving mode.

When the first image is photographed, photographing of a second image and the following images is automatically performed for each photographing parameter (photographing interval) arbitrarily set in advance. In this case, in the camera set in the second power saving mode (the camera on the master side), the interval photographing timer 3c starts a clocking operation. Then, when the timer 3c reaches time up and the clocking operation for the photographing interval is completed, the camera on the master side instructs its own imaging section 6 to perform image photographing at this timing, and transmits a photographing instruction to the other camera set in the first power saving mode (the camera on the slave side) so as to instruct it to perform interval photographing.

In the master-slave relation in this case, camera B serves as a master and camera A serves as a slave. Therefore, simultaneous photographing (photographing the second image) is performed under the initiative of camera B. When the second image is photographed as described above, the mode of camera A is switched to the second power saving mode and camera A functions as a camera on the master side. In addition, the mode of camera B is switched to the first power saving mode and camera B functions as a camera on the slave side. Accordingly, the interval photographing timer 3c of camera A starts a clocking operation. Then, when the timer 3c reaches time up and the clocking operation for the photographing interval is completed, camera A instructs its own imaging section 6 to perform image photographing at this timing, and transmits a photographing instruction signal to camera B. As a result, under the initiative of camera A, simultaneous photographing (photographing the third image) is performed. Hereafter, the cameras A and B are alternately switched between the first power saving mode and the second power saving mode for each photographing, and the master-slave relation is also alternately switched for each photographing, whereby simultaneous interval photographing is sequentially performed by the plurality of cameras.

Next, the operation concept of the imaging apparatuses (cameras) in the present embodiment is described with reference to flowcharts depicted in FIG. 5 to FIG. 8. Here, each function described in the flowcharts is stored in a readable program code format, and operations based on these program codes are sequentially performed. Also, operations based on the above-described program codes transmitted over a transmission medium such as a network can also be sequentially performed. That is, the unique operations of the present embodiment can be performed using programs and data supplied from an outside source over a transmission medium, in addition to a recording medium. Note that these flowcharts in FIG. 5 to FIG. 8 outline operations of the characteristic portion of the present embodiment from among all of the operations of the cameras. After exiting the flow in FIG. 5 to FIG. 8, the procedure returns to the main flow (not shown) of the overall operation.

The flowchart depicted in FIG. 5 to FIG. 8 illustrates an operation of each camera that is started when a menu item "simultaneous interval photographing" by a plurality of cameras is selected and specified from a menu screen where various photographing modes are being displayed by menu display.

When the menu item "simultaneous interval photographing" is selected and specified, the control section 1 of each of the cameras (for example, camera A and camera B) first performs processing for initializing the timer 3c for interval photographing, an image counter, and the like (Step S1 of FIG. 5), and then judges whether an operation of setting photographing parameters for interval photographing has been performed (Step S2). This parameter setting operation is not required to be performed on each of the plurality of cameras as long as it is performed on one of the cameras.

Here, when judged that a parameter setting operation of inputting a photographing interval (for example, ten seconds) and the number of images to be photographed (for example, 720 images) as photographing parameters for interval photographing has been performed by the operation section 4 of one of the cameras (YES at Step S2), the control section 1 performs processing of setting these input parameters (the photographing interval and the number of images to be photographed) in the work memory 3b of the camera subjected to the parameter setting operation (Step S3). Then, the control section 1 performs processing for transmitting these set photographing parameters (the photographing interval and the number of images to be photographed) from the wireless communicating section 7 to the other camera (Step S4).

For example, if the photographing parameter setting operation has been performed on camera A, the control section 1 of camera A causes the photographing parameters to be wirelessly transmitted to camera B. Conversely, if the photographing parameter setting operation has been performed on camera B, the control section 1 of camera B causes the photographing parameters to be wirelessly transmitted to camera A. Then, the control section 1 proceeds to Step S7. At Step S2, when judged that a photographing parameter setting operation has not been performed (NO at Step S2), the control section 1 determines that a setting operation has been performed using the other camera, and proceeds to the next Step S5 to judge whether photographing parameters (the photographing interval and the number of images to be photographed) have been received from the other camera. As the photographing parameters, not only the photographing interval and the number of images to be photographed but also a total time from the start to the end of interval photographing, the ending time or the ending date and time of interval photographing, and the like may be set.

Here, when judged that photographing parameters have not been received from the other camera (NO at Step S5), the control section 1 proceeds to next Step S7. Conversely, when judged that photographing parameters have been received from the other camera (YES at Step S5), the control section 1 performs processing for setting the photographing parameters in its work memory 3b (Step S6). Then, the control section 1 proceeds to Step S7. At this Step S7, the control section 1 judges whether the photographing parameters have been set in its work memory 3b. When judged that the photographing parameters have not been set (NO at Step S7), the control section 1 returns to Step S2 described above. Conversely, when judged that the photographing parameters have been set (YES at Step S7), the control section 1 proceeds to the flow of FIG. 6.

Figure 6:
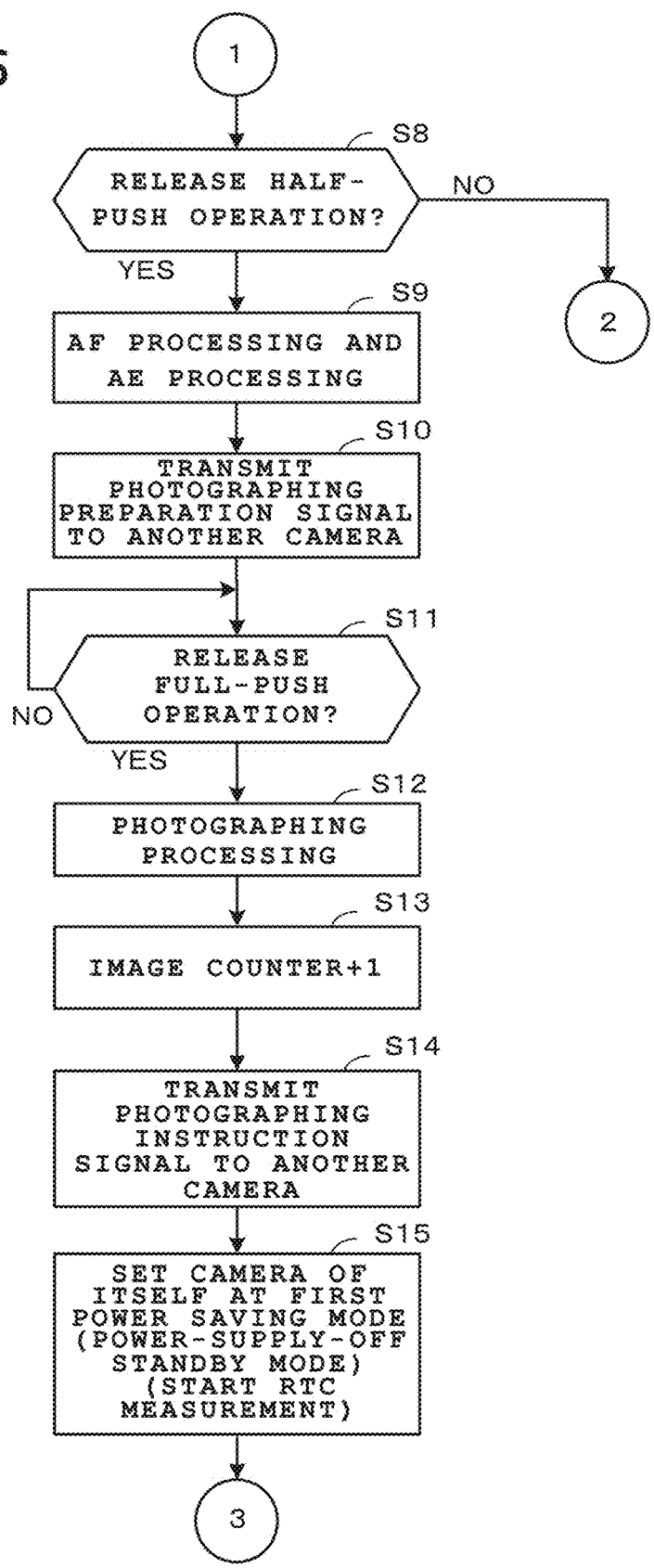
FIG. 6 is the flowchart of an operation following that of FIG. 5.
Figure 7:
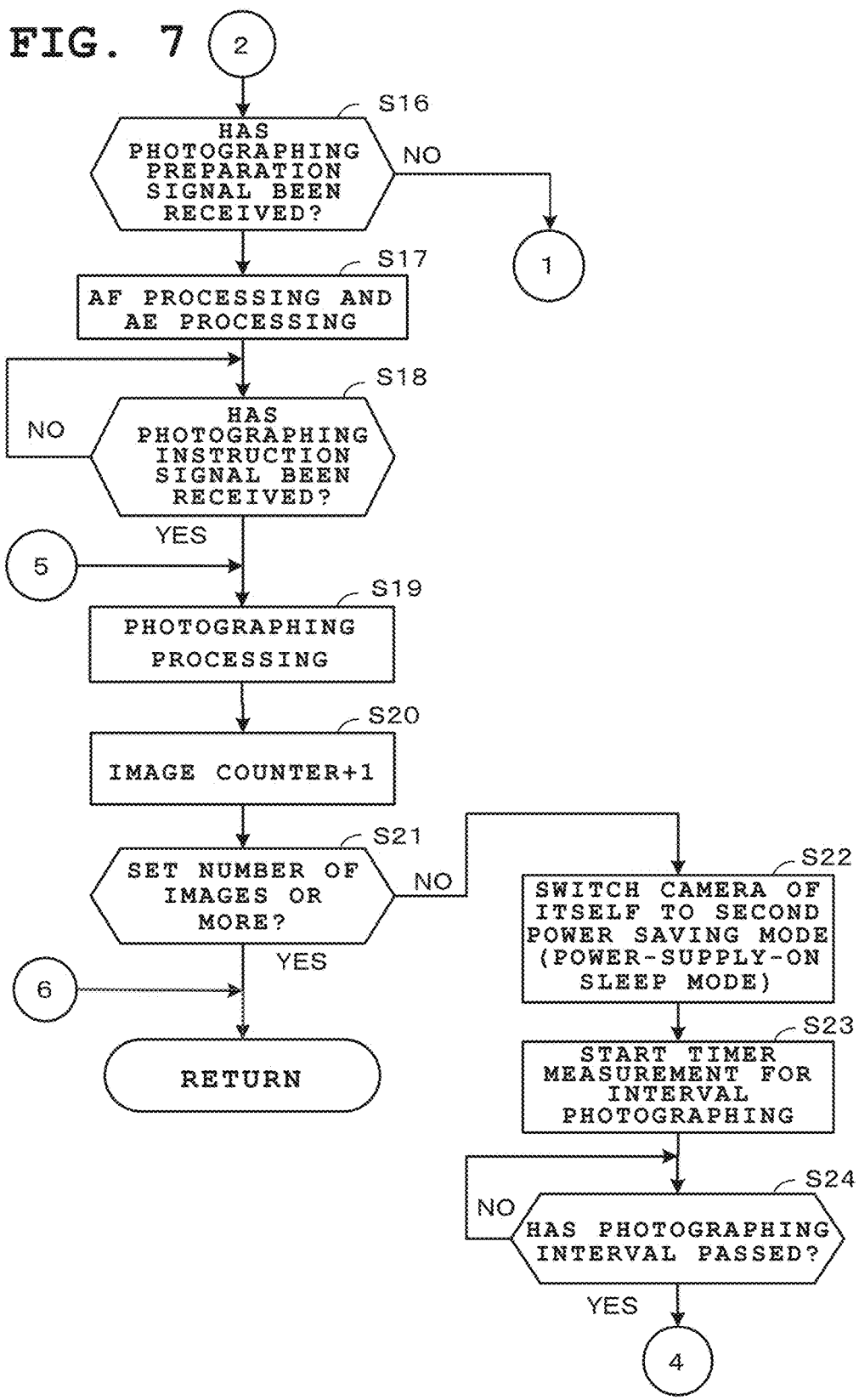
FIG. 7 is the flowchart of an operation following that of FIG. 6.

In the flow of FIG. 6, the control section 1 first judges whether a release half-press operation (half shutter operation: one-step press operation) has been performed, as a release operation for instructing to perform initial image photographing in interval photographing (a two-step push shutter operation) (Step S8). When judged that a release half-press operation has not been performed (NO at Step S8), the control section 1 proceeds to Step S16 of FIG. 7, and judges whether a photographing preparation instruction signal for instructing to prepare for image photographing (a signal instructing to perform photographing preparation processing such as automatic focus adjustment or automatic exposure adjustment) has been received from the other camera. Here, when a release half-press operation has been performed on camera A, the control section 1 of camera B judges whether a photographing preparation signal has been received from camera A. Conversely, when a release half-press operation has been performed on camera B, the control section 1 of camera A judges whether a photographing preparation signal has been received from camera B.

The following operations are described assuming that a release half-press operation has been performed on camera A.

When judged that a release half-press operation has been performed on camera A (YES at Step S8), the control section 1 of camera A starts automatic focus adjustment (AF) and automatic exposure adjustment (AE) (Step S9). Then, the control section 1 performs processing for transmitting a photographing preparation instruction signal from the wireless communicating section 7 to the other camera B (Step S10), and then enters and maintains a standby state until a release full-press operation (full shutter operation) is performed (Step S11). Then, when a release full-press operation (full shutter operation) is performed on camera A (YES at Step S11), the control section 1 performs photographing processing, performs processing such as image compression processing on an image obtained from the imaging section 6, and then performs processing for recording and storing the image in the image memory 3d (Step S12).

When the photographing of the first image by camera A is completed thereby, the control section 1 performs processing for incrementing the value of the image counter (omitted in the drawing) for counting the number of images photographed in interval photographing by "1" to update the counter value (Step S13). The image counter herein has an initial value of "0" before the photographing of the first image, and therefore the counter value is updated to "1" by the photographing of the first image. Next, the control section 1 of camera A transmits a photographing instruction signal instructing to perform interval photographing to camera B (Step S14). Then, the control section 1 performs initial setting such that camera A enters the first power saving mode (power-supply-OFF standby mode), and starts a clocking operation for a photographing standby time that continues until automatic activation (wakeup) is performed for the next image photographing (standby interval: a time period set corresponding to the photographing interval and shorter by a predetermined amount of time than the photographing interval that has been set in consideration of time required to prepare for image photographing after activation) by using the RTC 8 (Step S15). Then, the control section 1 proceeds to Step S30 of FIG. 8, and enters and maintains a standby state until it is automatically activated (wakeup) after the clocking operation for the photographing standby time (the time period corresponding to the photographing interval for interval photographing) by the RTC 8 is completed.

On the camera B side, when the photographing preparation instruction signal is received from camera A (YES at Step S16), the control section 1 of camera B starts automatic focus adjustment (AF) and automatic exposure adjustment (AE) (Step S17). Then, the control section 1 enters and maintains a standby state until the photographing instruction signal instructing to perform interval photographing is received from camera A (Step S18). When the photographing instruction signal is received from camera A (YES at Step S18), the control section 1 performs photographing processing in response to this photographing instruction signal, performs processing such as image compression processing on an image obtained from the imaging section 6, and then performs processing for recording and storing the image in the image memory 3d (Step S19).

When the photographing of the first image by camera B is completed thereby, the control section 1 performs processing for incrementing the value of the image counter (an initial value of "0") by "1" to update the counter value (Step S20). Then, the control section 1 compares the value of the image counter and the number of images to be photographed set as a photographing parameter to judge whether the value of the image counter is equal to or larger than the set number of images (Step S21). Here, the first image has been photographed, and the value of the image counter has not reached the number of images to be photographed (NO at Step S21). Therefore, the control section 1 proceeds to next Step S22, switches the mode of its camera (camera B) to the second power saving mode (power-supply-ON sleep mode), and causes the timer 3c for interval photographing to start a clocking operation (Step S23). Then, the control section 1 enters and maintains a standby state until the timer 3c ends the clocking operation for the photographing interval (Step S24).

When the photographing of the first image by each of the cameras (camera A and camera B) is completed as described above, the control section 1 proceeds to photographing of a second image after the photographing interval has elapsed. Here, at the end of the photographing of the first image, camera A is in the standby state for automatic activation (wakeup) by the RTC 8 (the standby state where the time period corresponding to the photographing interval is being clocked) (Step S30 of FIG. 8). In addition, camera B is in the standby state where the photographing interval is being clocked by the timer 3c (Step S24 of FIG. 7). In this standby state, the RTC 8 completes the clocking operation for the photographing standby time (standby interval) for automatic activation (wakeup) at timing earlier than the end of the clocking operation by the timer 3c, so that a photographing instruction signal transmitted from the other camera can be received. Note that, since the RTC 8 is clocking in units of seconds, the standby time according thereto has been set.

When the RTC 8 of camera A completes the clocking operation for the photographing standby interval (shorter than three seconds) before the timer 3c of camera B completes the clocking operation for the photographing interval (three seconds) (YES at Step S30 of FIG. 8), the control section 1 of camera A turns on power supply to the camera and activates (wakeup) the imaging section 6 so that camera A enters a photographing preparation state (Step S31). Then, the control section 1 enters and maintains a standby state until a photographing instruction signal is received from camera B (Step S32). Then, when the timer 3c of camera B ends the clocking operation for the photographing interval (YES at Step S24 of FIG. 7), the control section 1 proceeds to the flow of FIG. 8. Then, the control section 1 of camera B performs photographing processing, performs processing such as image compression processing on an image obtained from the imaging section 6, and then performs processing for recording and storing the image in the image memory 3d (Step S25).

When the photographing of the second image by camera B is completed thereby, the control section 1 performs processing for incrementing the value of the image counter by "1" to update the counter value to "2" (Step S26), and then judges whether the image counter value is equal to or larger than the set number of images (Step S27). Here, the second image has been photographed by camera B. If the counter value is smaller than the set number of images (NO at Step S27), the control section proceeds to Step S28, and transmits a photographing 1 instruction signal instructing to perform interval photographing to camera A from the wireless communicating section 7. Then, the control section 1 switches the current mode to the first power saving mode (power-supply-OFF standby mode) and starts a clocking operation for the photographing standby time by the RTC 8 (Step S29). Then, the control section 1 enters and maintains a standby state until the clocking operation for the photographing standby time by the RTC 8 is completed (Step S30).

On the other hand, when the photographing instruction signal is received from camera B (YES at Step S18 of FIG. 7), the control section 1 of camera A performs photographing processing, performs processing such as image compression processing on an image obtained from the imaging section 6, and then performs processing for recording and storing the image in the image memory 3d (Step S19). When the photographing of the second image by camera A is completed thereby, the control section 1 increments the value of the image counter by "1" to update the counter value to "2" (Step S20). Here, when the counter value is smaller than the set number of images (NO at Step S21), the control section 1 proceeds to Step S22, switches the mode of camera A to the second power saving mode (power-supply-ON sleep mode), and starts a clocking operation by the timer 3c for interval photographing (Step S23). Then, the control section 1 enters and maintains a standby state until the timer 3c completes the clocking operation for the photographing interval (Step S24).

When the photographing of the second image by each of the cameras (camera A and camera B) is completed, the control section 1 proceeds to photographing of a third image after the photographing interval has elapsed. That is, on the camera B side, the control section 1 is automatically activated (wakeup) from the standby state by the RTC 8 (Step S30 of FIG. 8) so as to prepare for photographing (Step S31), and then enters a photographing instruction standby state at Step S32. On the camera A side, after exiting from a photographing instruction standby state (Step S24 of FIG. 7), the control section 1 performs processing for photographing a third image (Step S5 of FIG. 8) and processing for switching the current mode to the first power saving mode (power-supply-OFF standby mode) (Step S29), and then enters and maintains a standby state until it is automatically activated (wakeup) based on a result of a clocking operation by the RTC 8 (Step S30 of FIG. 8). Then, on the camera B side, after exiting from the photographing instruction standby state (Step S18 of FIG. 7), the control section 1 performs processing for photographing a third image (Step S19) and processing for switching the current mode to the second power saving mode (power-supply-ON sleep mode) (Step S22), and enters a photographing instruction standby state (Step S24). By camera A and camera B alternately performing these operations every time an image is photographed, interval photographing is sequentially performed.

As described above, in the present embodiment, when a photographing interval for interval photographing is specified in interval photographing by a plurality of imaging apparatuses (camera A and camera B), the control section 1 of one of the imaging apparatuses (for example, camera A) generates a photographing instruction signal at the timing of the photographing interval so as to instruct its imaging section 6 to perform image photographing, transmits a photographing instruction signal from the wireless communicating section 7 to the other imaging apparatus (for example, camera B), and thereby controls simultaneous photographing (interval photographing) where camera A and camera B are synchronized with each other. As a result of this configuration, accurate interval photographing can be achieved without placing a burden on the user when interval photographing is performed on the same subject from different positions by a plurality of cameras.

Also, each camera includes the timer 3c for interval photographing, which clocks an arbitrary photographing interval specified by a user operation. When the timer 3c of one of these cameras is halting a clocking operation, the other camera generates a photographing instruction signal at the timing of the photographing interval clocked by its timer 3c, whereby image photographing is performed by this camera and the other camera. As a result of this configuration, simultaneous interval photographing can be performed under the initiative of any one of plural cameras.

Moreover, in a camera in the first power saving mode, a photographing standby time is clocked by the RTC 8. In addition, in a camera in the second power saving mode (power-supply-ON sleep mode), a photographing interval is clocked by the timer 3c for interval photographing, and a photographing instruction signal is generated at the timing of this photographing interval clocked by the timer 3c. As a result of this configuration, simultaneous interval photographing can be performed based on a result of a clocking operation by the timer 3c having high accuracy.

Furthermore, the first power saving mode is a mode in a low power consumption state where power supply to the apparatus body excluding the RTC 8 is OFF, and the second power saving mode is a mode in a low power consumption state where preparations for next image photographing are made with power supply to the apparatus body including the control section being kept ON. As a result of this configuration, the entire power consumption can be reduced by one of a plurality of cameras being set in the first power saving mode and the other being set in the second power saving mode, and accurate interval photographing can be achieved.

Still further, this camera functions as a camera on the master side when it is in the second power saving mode, and functions as a camera as on the slave side when it is in the first power saving mode. As a result of this configuration, the master-slave relation can be switched according to switching between the power saving modes.

Yet still further, the first power saving mode is set immediately after a release operation for instructing to perform initial image photographing in interval photographing is performed, and the second power saving mode is switched to the first power saving mode immediately after an instruction for simultaneous photographing (interval photographing) is provided. As a result of this configuration, switching to the first power saving mode where power consumption is low can be made without waste, and the entire power consumption can be reduced.

Yet still further, when a photographing instruction signal is received from a camera on the master side, a camera on the slave side provides a photographing instruction to its imaging section 6, and switches its mode from the first power saving mode to the second power saving mode immediately after providing the photographing instruction. As a result of this configuration, accurate simultaneous photographing (interval photographing) can be performed, and the entire power consumption can be reduced.

Yet still further, when power supply to a camera on the slave side is OFF by the camera being switched to the first power saving mode, if a clocking operation for a photographing standby time by the RTC 8 is completed, the power supply to the camera is turned ON for automatic activation (wakeup) so that the camera enters a photographing enable state. As a result of this configuration, when a photographing instruction signal is received from one camera, the other camera can give an instruction for image photographing to its imaging section 6 immediately.

Yet still further, after being set in one camera, photographing parameters including an arbitrary photographing interval specified by a user operation are transmitted to the other camera via wireless communication and set therein. As a result of this configuration, a photographing parameter setting operation is only required to be performed on one of a plurality of cameras, which reduces a burden on the user.

Yet still further, in an imaging system where a plurality of cameras capable of interval photographing for sequentially photographing a plurality of images at predetermined photographing intervals are communicably connected to each other in a master-slave relation, one camera on the master side gives a photographing instruction to its imaging section 6 by generating a photographing instruction signal at the timing of a photographing interval for interval photographing, and transmits the photographing instruction signal to the other camera so as to control simultaneous photographing (interval photographing) where the camera on the master side and the other camera are synchronized with each other. Then, the camera on the slave side gives a photographing instruction to its imaging section 6 in synchronization with the reception of the photographing instruction signal from the camera on the master side. As a result of this configuration, when interval photographing is to be performed on the same subject from different positions by using a plurality of cameras, accurate interval photographing can be achieved without placing a burden on the user.

Yet still further, a camera on the master side and a camera on the slave side are sequentially switched for each photographing. As a result of this configuration, even in interval photographing where the total power consumption amount is high, the power consumption amount of each camera can be equalized, and therefore the photographing can be performed for a long period of time in the system as a whole.

In the above-described embodiment, the master-slave relation is alternately changed between two cameras (camera A and camera B) for each image photographing. However, a configuration may be adopted in which one camera is fixed to function on the master side and the other camera is fixed to function on the slave side. Also, a configuration may be adopted in which the master-slave relation is alternately changed every time a plurality of images are photographed, or a configuration may be adopted in which the master-slave relation is changed only once according to the remaining amount of the battery.

FIG. 9 is a diagram exemplarily depicting the case where the master-slave relation is fixed. That is, camera B of the two cameras (camera A and camera B) is fixed to function on the master side and the other camera A is fixed to function on the slave side.

Here, camera A generates a photographing instruction signal according to a release operation, and thereby instructs its imaging section 6 to perform image photographing. Subsequently, camera A transmits the photographing instruction signal from the wireless communicating section 7 to camera B, and thereby controls simultaneous photographing (interval photographing) for a first image. Then, camera A is fixed in the first power saving mode (power-supply-OFF standby mode), and camera B is fixed in the second power saving mode (power-supply-ON sleep mode). In this state, every time the timing of a photographing interval is detected, camera B generates a photographing instruction signal to instruct its imaging section 6 to perform photographing, and transmits the photographing instruction signal from the wireless communicating section 7 to camera A, whereby simultaneous photographing (interval photographing) for a second image and the following images is controlled. Note that, conversely, camera A may be fixed to function on the master side and camera B may be fixed to function on the slave side.

Also, in the above-described embodiment, the master and the slave of the master-slave relation is alternately switched between the two cameras (camera A and camera B). However, a configuration may be adopted in which the master-slave relation is sequentially changed for each photographing among three or more cameras.

FIG. 10 is a diagram exemplarily depicting the case where the master-slave relation is sequentially changed for each photographing among three cameras (camera A, camera B, and camera C). That is, among three cameras (camera A, camera B, and camera C), one camera is switched to function on the master side, and each of the other cameras is switched to function on the slave side.

Here, camera A generates a photographing instruction signal according to a release operation, and thereby instructs its imaging section 6 to perform image photographing. Subsequently, camera A transmits the photographing instruction signal to camera B from the wireless communicating section 7, and thereby controls simultaneous photographing (interval photographing) for a first image. Then, camera A and camera C are set in the first power saving mode (power-supply-OFF standby mode), and camera B is set in the second power saving mode (power-supply-ON sleep mode). In this state, when the timing of a photographing interval is detected, camera B generates a photographing instruction signal, and thereby instructs its imaging section 6 to perform image photographing. Subsequently, camera B transmits the photographing instruction signal from the wireless communicating section 7 to camera A and camera C, and thereby controls simultaneous photographing (interval photographing) for a second image.

Then, camera A and camera B are set in the first power saving mode (power-supply-OFF standby mode), and camera C is set in the second power saving mode (power-supply-ON sleep mode). In this state, when the timing of a photographing interval is detected, camera C generates a photographing instruction signal, and thereby instructs its imaging section 6 to perform image photographing. Subsequently, camera C transmits the photographing instruction signal from the wireless communicating section 7 to camera A and camera B, and thereby controls simultaneous photographing (interval photographing) for a third image. Note that the number of the cameras may be four or more.

Moreover, in the above-described embodiment, the present invention has been exemplarily applied in a compact digital camera as an imaging apparatus. However, the present invention is not limited thereto, and may be applied in a twin-lens reflex digital camera, a camera-function-equipped personal computer, a camera-function-equipped PDA (Personal Digital Assistance), a camera-function-equipped tablet terminal device, a camera-function-equipped portable telephone such as smartphone, a camera-function-equipped electronic game machine, a camera-function-equipped music player, or the like.

Furthermore, the "apparatus" or the "sections" described in the above-described embodiment are not required to be in a single housing and may be separated into a plurality of housings by function. In addition, the steps in the above-described flowcharts are not required to be processed in time-series, and may be processed in parallel, or individually and independently.

Still further, in the above-described embodiment, the control section 1 is operated based on the programs stored in the storage section 3, whereby various types of functions (processing or sections) required to achieve the various types of effects described above are partially or entirely actualized (performed or configured). However, this is merely an example and other various methods can be used to actualize these functions.

For example, these various functions may be partially or entirely actualized by an electronic circuit, such as an IC (Input Circuit) or a LSI (Large-Scale Integration). Note that specific examples of the configuration of this electronic circuit are not described herein because a person ordinarily skilled in the art of the invention can easily actualize this configuration based on the flowcharts and the functional block diagrams described in the specification (For example, judgment processing accompanied by branch processing in the flowcharts can be configured by input date being compared by a comparator and a selector being switched by the comparison result).

Also, the plural functions (processing or sections) required to achieve the various effects can be freely divided. The following are examples thereof.

(Configuration 1)

An imaging apparatus capable of interval photographing, including:

an imaging section which performs interval photographing of sequentially photographing a plurality of images at predetermined photographing intervals;

a wireless communicating section which wirelessly and communicably connects the imaging apparatus with an other imaging apparatus;

an operation section which specifies an arbitrary photographing interval for the interval photographing; and a control section which sequentially generates photographing instruction signals at photographing intervals specified by the operation section, in which the control section instructs its own imaging section to perform image photographing when a photographing instruction signal is generated, and transmits the photographing instruction signal to the other imaging apparatus via the wireless communicating section so as to control interval photographing where photographing timing of the imaging apparatus and photographing timing of the other imaging apparatus are synchronized with each other.

(Configuration 2)

The imaging apparatus described in configuration 1, in which the control section causes the other imaging apparatus to clock the photographing interval when a clocking operation for the photographing interval by the imaging apparatus is being halted, and specifies the photographing timing of the imaging apparatus according to a photographing instruction signal transmitted from the other imaging apparatus based on the photographing interval clocked by the other imaging apparatus.

(Configuration 3)

The imaging apparatus described in configuration 2, in which the control section clocks the photographing interval specified by the operation section, and sequentially generates photographing instruction signals at photographing intervals clocked by the control section, when a clocking operation for the photographing interval by the other imaging apparatus is being halted.

(Configuration 4)

The imaging apparatus described in configuration 3, in which the control section in the interval photographing switches a current mode to a first power saving mode where power consumption is lower than power consumption in a normal photographing mode, and halts a clocking operation for the photographing interval by the imaging apparatus in the first power saving mode.

(Configuration 5)

The imaging apparatus described in configuration 4, further including:

a clock circuit section which has an integral clock whose power consumption is low although accuracy in a time unit capable of being clocked is lower than accuracy of a clocking operation by the control section, in which the first power saving mode is a state where power supply to predetermined circuits including at least a circuit for performing the clocking operation by the control section and a circuit for performing a communication operation by the wireless communicating section is OFF and power supply to the clock circuit section is ON, and in which the clock circuit section has a wakeup function by which, in the first power saving mode, a standby time shorter by a predetermined amount of time than the photographing interval specified by the operation section is clocked, and the power supply to the predetermined circuits is turned ON after the standby time is clocked, so that the measuring operation by the control section and the clocking operation by the wireless communicating section are enabled.

(Configuration 6)

The imaging apparatus described in configuration 4, in which the control section in a photographing standby state immediately after end of preceding image photographing and before start of following image photographing in the interval photographing switches between the first power saving mode and a second power saving mode where power consumption is larger than the power consumption of the first power saving mode, in which the control section in the second power saving mode clocks the photographing interval specified by the operation section, and in which the clock circuit section in the first power saving mode clocks a standby interval corresponding to the photographing interval specified by the operation section.

(Configuration 7)

The imaging apparatus described in configuration 6, in which the first power saving mode is a mode in a low power consumption state where power supply to an apparatus body excluding the clock circuit section is OFF, and in which the second power saving mode is a mode in a low power consumption state where preparation for the following image photographing is made with power supply to the apparatus body including the control section being kept ON.

(Configuration 8)

The imaging apparatus described in configuration 6, in which the imaging apparatus functions as an imaging apparatus on a master side in the second power saving mode and functions as an imaging apparatus on a slave side in the first power saving mode.

(Configuration 9)

The imaging apparatus described in configuration 6, in which the control section sets the first power saving mode immediately after a release operation for instructing to perform initial image photographing in the interval photographing is performed, and switches from the second power saving mode to the first power saving mode immediately after the photographing instruction signal is transmitted to the other imaging apparatus.

(Configuration 10)

The imaging apparatus described in configuration 8, in which the control section functioning on the slave side instructs its own imaging section to perform image photographing when the photographing instruction signal is received from the other imaging apparatus on the master side, and in which the control section switches from the first power saving mode to the second power saving mode immediately after the photographing instruction.

(Configuration 11)

The imaging apparatus described in configuration 10, in which the control section functioning on the slave side switches between the first power saving mode and the second power saving mode having different power consumption states, in the photographing standby state immediately after the end of the preceding photographing and before the start of the following image photographing in the interval photographing, in which the control section, when a clocking operation for the standby interval by the clock circuit section is completed with the power supply to the apparatus body being turned OFF by switching to the first power saving mode, turns on the power supply to the apparatus body so as to return to a photographable state, in which the control section instructs its own imaging section to perform image photographing when the photographing instruction signal is received from the other imaging apparatus on the master side with the power supply to the apparatus body being turned ON by the return, and in which the clock circuit section clocks the standby interval corresponding to the photographing interval, in the first power saving mode where the power consumption is lower than the power consumption of the second power saving mode.

(Configuration 12)

The imaging apparatus described in configuration 1, in which the control section sets, in the imaging apparatus, a photographing parameter including the photographing interval specified by the operation section, and transmits the photographing parameter to the other imaging apparatus from the wireless communicating section so as to instruct the other imaging apparatus to set the photographing parameter.

(Configuration 13)

An imaging system capable of synchronous interval photographing by a plurality of imaging apparatuses, in which an imaging apparatus functioning as a master (i) clocks photographing intervals in the interval photographing, (ii) sequentially generates photographing instruction signals at the clocked photographing intervals, (iii) instructs its own imaging section to perform image photographing and transmits a photographing instruction signal to an other imaging apparatus functioning as a slave every time a photographing instruction signal is generated, and in which the other imaging apparatus functioning as the slave instructs its own imaging section to perform image photographing every time a photographing instruction signal is received from the imaging apparatus functioning as the master.

(Configuration 14)

The imaging system described in configuration 13, in which the imaging apparatus functioning as the master and the imaging apparatus functioning as the slave among the plurality of imaging apparatuses are switched during the interval photographing.

(Configuration 15)

The imaging system described in configuration 14, in which the imaging apparatus functioning as the master and the imaging apparatus functioning as the slave among the plurality of imaging apparatuses are alternately switched during the interval photographing.

(Configuration 16)

A photographing method by an imaging apparatus capable of interval photographing, including:

a step of specifying an arbitrary photographing interval for the interval photographing;

a step of clocking the specified photographing interval;

a step of sequentially generating photographing instruction signals at clocked photographing intervals; and a step of instructing its own imaging section to perform image photographing and transmitting a photographing instruction signal to an other imaging apparatus every time a photographing instruction signal is generated, so as to perform interval photographing where photographing timing of the imaging apparatus and photographing timing of the other imaging apparatus are synchronized with each other.

(Configuration 17)

A photographing method for synchronous interval photographing by a plurality of imaging apparatuses, including:

a step of controlling an imaging apparatus functioning as a master such that the imaging apparatus functioning as the master (i) clocks photographing intervals in the interval photographing, (ii) sequentially generates photographing instruction signals at the clocked photographing intervals, (iii) instructs its own imaging section to perform image photographing and transmits a photographing instruction signal to an other imaging apparatus functioning as a slave every time a photographing instruction signal is generated; and a step of controlling the imaging apparatus functioning as the slave such that the imaging apparatus functioning as the slave instructs its own imaging section to perform image photographing every time a photographing instruction signal is received from the imaging apparatus functioning as the master.

While the present invention has been described with reference to the preferred embodiments, it is intended that the invention be not limited by any of the details of the description therein but includes all the embodiments which fall within the scope of the appended claims.

What is claimed is:

1. An imaging apparatus capable of interval photographing, the imaging apparatus comprising:
   a wireless communication unit configured for forming a wireless connection with another apparatus, the wireless communication unit receiving photographing instruction signals from the other apparatus at predetermined photographing intervals;
   an imaging section including an optical lens which performs interval photographing by sequentially photographing a plurality of images based on the photographing instruction signals received by the communication unit; and
   a processor configured to be operable during the interval photographing to switch to a first power saving mode where power consumption is lower than power consumption in a normal photographing mode.

2. An imaging apparatus according to claim 1,
   wherein the other apparatus comprises a second imaging section including an optical lens which performs the interval photographing,
   wherein the other apparatus instructs the second imaging section to perform the interval photographing while the other apparatus transmits the photographing instruction signals to the imaging apparatus,
   wherein the imaging apparatus performs the interval photographing by photographic timing of the imaging apparatus to be synchronized with the other apparatus.

3. An imaging apparatus according to claim 1,
wherein the other apparatus transmits photographing instruction signals to the imaging apparatus and a different imaging apparatus,
wherein the imaging apparatus performs the interval photographing by photographic timing of the imaging apparatus to be synchronized with the different imaging apparatus.

4. An imaging apparatus according to claim 1, further comprising an operation section including a button which specifies an arbitrary photographing interval for the interval photographing; and
wherein the wireless connection formed by the wireless communication unit comprises a wireless LAN which wirelessly and communicably connects the imaging apparatus with the other apparatus,
wherein the processor is configured to sequentially generate the photographing instruction signals at photographing intervals specified by the operation section,
wherein the processor is configured to instruct the imaging section of the imaging apparatus to perform image photographing when a photographing instruction signal is generated, and transmit the photographing instruction signal to the other apparatus via the wireless communication unit so as to control the interval photographing where photographing timing of the imaging apparatus and photographing timing of the other apparatus are synchronized with each other,
wherein the processor is configured to cause the other apparatus to clock the photographing interval when a clocking operation for the photographing interval by the imaging apparatus is being halted, and specify the photographing timing of the imaging apparatus according to a photographing instruction signal transmitted from the other apparatus based on the photographing interval clocked by the other apparatus,
wherein the processor is configured to clock the photographing interval specified by the operation section, and sequentially generate the photographing instruction signals at photographing intervals clocked by the processor, when a clocking operation for the photographing interval by the other apparatus is being halted, and
wherein the processor during the interval photographing is configured to switch a current mode to the first power saving mode where power consumption is lower than power consumption in the normal photographing mode, and halts a clocking operation for the photographing interval by the imaging apparatus in the first power saving mode.

5. The imaging apparatus according to claim 4, further comprising:
a clock circuit section which has an integral clock whose power consumption is low although accuracy in a time unit capable of being clocked is lower than accuracy of a clocking operation by the processor,
wherein the first power saving mode is a state where power supply to predetermined circuits including at least a circuit for performing the clocking operation by the processor and a circuit for performing a communication operation by the wireless communication unit is OFF and power supply to the clock circuit section is ON, and
wherein the clock circuit section has a wakeup function by which, in the first power saving mode, a standby time shorter by a predetermined amount of time than the photographing interval specified by the operation section is clocked, and the power supply to the predetermined circuits is turned ON after the standby time is clocked, so that a measuring operation by the processor and the clocking operation by the processor are enabled.

6. The imaging apparatus according to claim 4, wherein the processor is configured to, in a photographing standby state immediately after an end of a preceding image photographing operation and before start of a following image photographing operation during the interval photographing, switch between the first power saving mode and a second power saving mode where power consumption is larger than the power consumption of the first power saving mode, wherein the processor in the second power saving mode clocks the photographing interval specified by the operation section, and
wherein the clock circuit section in the first power saving mode clocks a standby interval corresponding to the photographing interval specified by the operation section.

7. The imaging apparatus according to claim 6, wherein the first power saving mode comprises a low power consumption state where power supply to an apparatus body excluding the clock circuit section is OFF, and
wherein the second power saving mode comprises a low power consumption state where preparation for the following image photographing is made with power supply to the apparatus body including the processor being kept ON.

8. The imaging apparatus according to claim 6, wherein the imaging apparatus functions as an imaging apparatus on a master side in the second power saving mode and functions as an imaging apparatus on a slave side in the first power saving mode.

9. The imaging apparatus according to claim 8, wherein the processor is configured to, when the imaging apparatus is functioning on the slave side, instruct the imaging section of the imaging apparatus to perform image photographing when the photographing instruction signal is received from the other apparatus on the master side, and
wherein the processor is configured to switch from the first power saving mode to the second power saving mode immediately after the photographing instruction is received.

10. The imaging apparatus according to claim 9, wherein the processor is configured to, when imaging apparatus is functioning on the slave side, switch between the first power saving mode and the second power saving mode having different power consumption states, in the photographing standby state immediately after the end of the preceding photographing operation and before the start of the following image photographing operation during the interval photographing,
wherein the processor is configured to, when a clocking operation for the standby interval by the clock circuit section is completed with the power supply to the apparatus body being turned OFF by switching to the first power saving mode, turn on the power supply to the apparatus body so as to return to a photography enabled state,
wherein the processor is configured to instruct the imaging section of the imaging apparatus to perform image photographing when the photographing instruction signal is received from the other apparatus on the master side with the power supply to the apparatus body being turned ON by the return, and
wherein the clock circuit section clocks the standby interval corresponding to the photographing interval, in the first power saving mode where the power consumption is lower than the power consumption of the second power saving mode.

11. The imaging apparatus according to claim 6, wherein the processor is configured to set the imaging apparatus to the first power saving mode immediately after a release operation for instructing the imaging apparatus to perform an initial image photographing operation during the interval photographing, and switch from the second power saving mode to the first power saving mode immediately after the photographing instruction signal is transmitted to the other apparatus.

12. The imaging apparatus according to claim 4, wherein the processor is configured to set, in the imaging apparatus, a photographing parameter including the photographing interval specified by the operation section, and transmit the photographing parameter to the other apparatus from the wireless communication unit so as to instruct the other apparatus to set the photographing parameter.

* * * * *